(No Model.)

J. K. DIMMICK.
PIPE JOINT.

No. 252,001. Patented Jan. 3, 1882.

Attest:
W. W. Dodge.
Dan¹ Kelly.

Inventor:
Jacob K. Dimmick
By Parkinson & Parkinson
Attorneys.

UNITED STATES PATENT OFFICE.

JACOB K. DIMMICK, OF NEWPORT, KENTUCKY.

PIPE-JOINT.

SPECIFICATION forming part of Letters Patent No. 252,001, dated January 3, 1882.

Application filed April 6, 1881. (No model.)

*To all whom it may concern:*

Be it known that I, JACOB K. DIMMICK, of Newport, in the county of Campbell and State of Kentucky, have invented certain new and useful Improvements in Pipe-Joints, of which the following is a specification.

My invention relates to that class of cast pipes which are joined or united by inserting the end of one section into the mouth of another and packing the joint with lead or other material; and the improvements consist in forming the bell-mouth or faucet end of each section in pipes of said description with a regular internal taper or bevel, in order that the entering or spigot end of the adjoining section shall center itself therein and insure the alignment of the two sections; in making the bell-mouth or faucet end without abrupt ends or shoulders; in forming the entering or spigot end with a taper corresponding to that of the bell-mouth or faucet end, and in other features and details hereinafter explained, the improvements being more especially designed for use in water or gas mains and sewer or drain-pipes.

Figure 1:
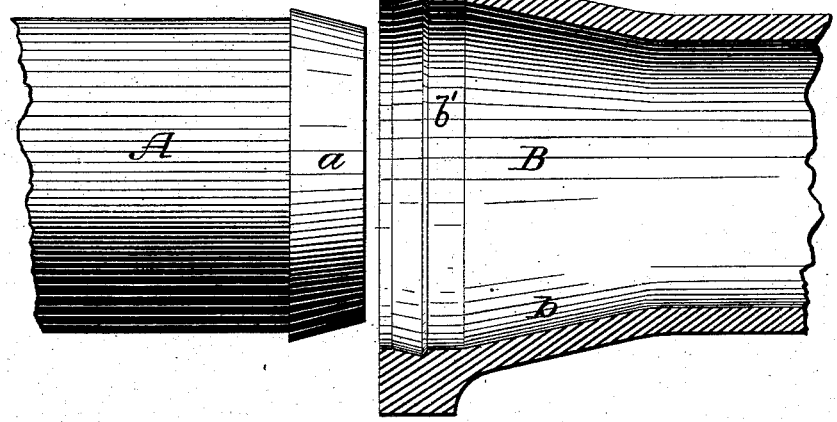
Figure 2:
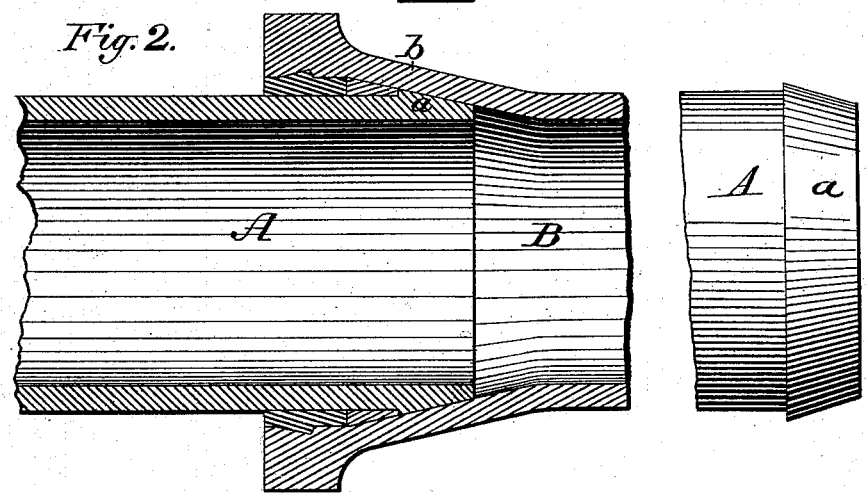
Figure 3:
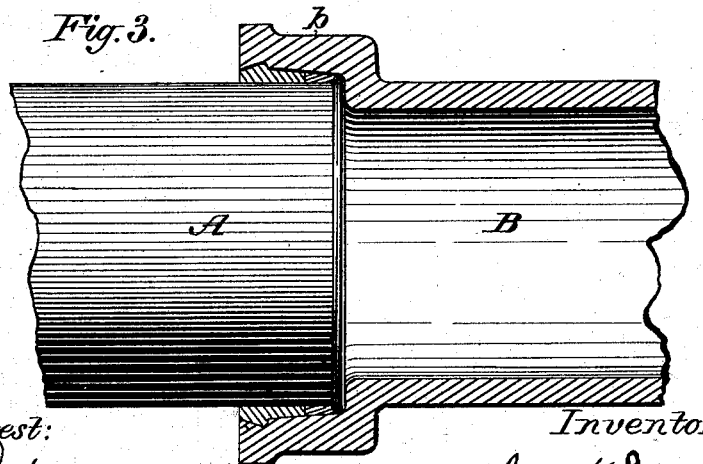

In the accompanying drawings, Figure 1 represents the adjoining ends of two pipe-sections, the bell-mouth or faucet end being shown in section; Figs. 2 and 3, longitudinal central sections of joints or couplings, showing my improvements.

As hitherto manufactured, pipes of this class have been formed with a bell-mouth at one end, having parallel internal walls or sides, and with a bead or flange at the opposite end, to enter the bell-mouth or faucet end of an adjoining section, and under such construction much difficulty has been experienced in accurately centering and aligning the pipe-sections. My invention is designed to overcome this difficulty, and to avoid the necessity of the expensive class of labor now employed for this part of the work, while providing in the most feasible and convenient manner for tamping or packing the joints with lead or other suitable metal, as necessary in laying pipes of this character. To this end the bell-mouth or faucet end is made of conical or tapering form on its interior beyond the chamber or space for the reception of the tamping or packing, thus causing the entering or spigot end of the next section to center itself and ride accurately to place therein, and this, too, whether said end be made, as usual, with a slight bead or flange, or, as I prefer, with a taper corresponding to that of the mouth which it enters.

In casting pipe it is found difficult to cause the metal to flow freely and properly about the bends or angles, usually formed therein at the bell-mouth or faucet end; hence the metal at such points is more or less spongy and porous and lacking in strength, and is in consequence usually made of greater thickness at such points. Under my improved construction all shoulders, angles, and abrupt bends may be avoided, and the pipe rendered stronger than heretofore, without increasing the thickness of metal at the point of enlargement beyond its thickness at other points.

A and B represent respectively the spigot end and bell-mouth or faucet end of two pipe-sections, the former of which may be made of the usual form, with a bead or flange at its extremity, as in Fig. 3, but is preferably formed, as shown in Figs. 1 and 2, with a tapering or conical end, $a$, which is or may be shouldered to form an abutment for the packing, as shown, and in so far resemble a bead.

The bell-mouth or faucet end, $b$, is preferably formed with a regular unbroken taper, as in Figs. 1 and 2, corresponding with that of the end $a$, but may be of the usual form, with the exception of a bevel or taper on the inside, as in Fig. 3, this latter form being particularly well adapted for use in connection with sections of pipe having the entering or spigot end of the ordinary form, as shown in the same figure. When made of the form indicated in Figs. 1 and 2 the bell-mouth or faucet end may be of uniform thickness with the body of the pipe, because the metal, not having to flow around sharp bends or angles, readily fills the mold and insures a strong and perfect casting.

It is apparent that either form of the entering end may be used with either form of the bell-mouth or faucet end, and that, if desired, the bell-mouth may be made without a shoulder or bend on the exterior, but with a shoulder at the inner termination of the taper, rising into line with the inner face of the pipe.

As already intimated, the usual space, $b'$, will be left for the lead or other packing material, and the mouth will be formed with an internal groove to retain the same in place, as in pipes now in use.

I am aware that it is not new to provide pipes with an internal zone-surface at the faucet end and a corresponding external zone surface at the spigot end, the object being to form a ball-and-socket joint. This differs from my invention in not having beveled or regular tapering surfaces; in not furnishing means for the alignment of the pipes, and in requiring that the surfaces shall be turned at great expense; whereas in mine they will be formed in the act of casting and at no additional cost.

I am also aware that metal pipes cement-lined have been made with the spigot end tapering and the faucet end flaring, for the purpose of fitting them together. Such pipes are always formed of wrought or rolled metal riveted along a seam, and their construction and the manner of joining them together form no part of my invention.

I claim—

1. The combination of two pipe-sections, one provided with a mouth having a chamber for the reception of packing, and beyond that of regular internal taper or bevel, and the other with an end adapted to enter said mouth and to bear against the internally-tapering walls thereof on all sides.

2. As an improved article of manufacture, a pipe having one end formed or provided with a shoulder or bead and the opposite end formed with a mouth of regular internal taper.

3. A cast pipe formed at one end with a mouth chambered for the reception of packing, and beyond that of regular internal taper or bevel, and at the other end having a shoulder or bead adapted to enter a corresponding mouth in the next pipe and bear against the tapering walls thereof, to center and align the two pipes for the process of tamping or packing.

4. In combination with a pipe-section having a regularly-tapering as distinguished from a zonular mouth, the entrance of which mouth is enlarged for the reception of packing, a second section having its end shouldered and correspondingly tapered and seated in said mouth against the tapering walls thereof.

JACOB K. DIMMICK.

Witnesses:
WILLIAM W. DODGE,
DANL. KELLY.